US012762076B2

(12) United States Patent

Kim

(10) Patent No.: US 12,762,076 B2
(45) Date of Patent: Oct. 13, 2026

(54) INTERFACE METHOD FOR TRANSMITTING AND RECEIVING DATA BETWEEN FUNCTIONAL BLOCKS IN SYSTEM ON CHIP, AND SYSTEM ON CHIP USING SAME

(71) Applicant: SEMIFIVE INC., Seongnam-si (KR)

(72) Inventor: Sung Su Kim, Seongnam-si (KR)

(73) Assignee: SEMIFIVE INC., Seongnam-si (KR)

( * ) Notice: Subject to any disclaimer, the term of this patent is extended or adjusted under 35 U.S.C. 154(b) by 358 days.

(21) Appl. No.: 18/369,345

(22) Filed: Sep. 18, 2023

(65) Prior Publication Data

US 2024/0004816 A1 Jan. 4, 2024

Related U.S. Application Data

(63) Continuation of application No. PCT/KR2021/015957, filed on Nov. 4, 2021.

(30) Foreign Application Priority Data

Jul. 27, 2021 (KR) ........................ 10-2021-0098291

(51) Int. Cl.
*G06F 13/38* (2006.01)

(52) U.S. Cl.
CPC .......... *G06F 13/38* (2013.01); *G06F 2213/40* (2013.01)

(58) Field of Classification Search
CPC ............................ G06F 13/38; G06F 2213/40
USPC ............................................................ 710/33
See application file for complete search history.

(56) References Cited

U.S. PATENT DOCUMENTS

2012/0177343 A1 7/2012 Sasaki et al.
2014/0201398 A1* 7/2014 Agrawal .................. G06F 5/12 710/57
2015/0236870 A1* 8/2015 Lee ..................... G06F 13/4068 370/257
2016/0182391 A1* 6/2016 Theobald ................ H04L 47/39 370/230
2017/0262389 A1* 9/2017 Raupp Da Rosa ..... G06F 13/28

FOREIGN PATENT DOCUMENTS

KR 10-2002-0084836 A 11/2002
KR 10-2004-0040458 A 5/2004
KR 10-2007-0087666 A 8/2007
KR 10-2015-0099394 A 8/2015

* cited by examiner

*Primary Examiner* — Brian T Misiura
(74) *Attorney, Agent, or Firm* — Bridgeway IP Law Group, PLLC; Sang Ho Lee; Hyun Woo Shin

(57) ABSTRACT

An interface method in a system-on-chip includes: a process of transmitting, by a first circuit unit, first payload data transferred from a first functional block and a first signal for requesting buffer allocation for storing the first payload data to a second circuit unit, and decreasing a resource value in which an initial value is set to correspond to the number of payload data which may be stored in a buffer provided in the second circuit unit by one; a process of storing, by the second circuit unit, the first payload data in the buffer according to the first signal; a process of withdrawing, by the second circuit unit, payload data selected among the payload data stored in the buffer, and transferring the payload data to a second functional block, and transmitting a second signal indicating that the buffer is empty to the first circuit unit; and a process of increasing, by the first circuit unit, the resource value by one.

13 Claims, 10 Drawing Sheets

INTERFACE METHOD FOR TRANSMITTING AND RECEIVING DATA BETWEEN FUNCTIONAL BLOCKS IN SYSTEM ON CHIP, AND SYSTEM ON CHIP USING SAME

CROSS-REFERENCE TO RELATED APPLICATIONS

The present application is a continuation application of International Patent Application No. PCT/KR2021/015957 filed Nov. 4, 2021, and claims priority under 35 U.S.C. § 365 and/or 35 U.S.C. § 119(a) to Korean Patent Application No. 10-2021-0098291 filed Jul. 27, 2021, the entire contents of which are incorporated herein by reference.

BACKGROUND OF THE INVENTION

Field of the Invention

The present invention relates to an interface method for transmitting and receiving data between functional blocks in a system-on-chip and a system-on-chip using the same.

Description of the Related Art

A system-on-chip is generated by making a system constituted by devices having various functions into one chip. For example, main semiconductor elements such as a computation element (CPU), a memory element, and a digital signal processing element are implemented in one chip to allow the chip itself to become one system.

In order to develop the system-on-chip, long-term design and various functions are required, and an intellectual property (IP) block is used to easily develop a large circuit with small development cost by securing a standardized functional block.

The IP block is an IP functional module which can be commonly reused in the system-on-chip design enables design efficiency increase, performance enhancement, and development period shortening of the system-on-chip at the time of utilizing the IP block.

However, when a new system-on-chip is designed by using conventionally designed function blocks like the IP block, data transfer schemes, operating frequencies, and signal synchronization schemes do not generally coincide with each other between the functional blocks. Therefore, an interface method for data exchange between the functional blocks is required at the time of developing the system-on-chip.

SUMMARY OF THE INVENTION

Therefore, the present invention has been made in an effort to provide an interface method for transmitting and receiving data between various functional blocks provided in a system-on-chip and a system-on-chip using the same.

In order to achieve the object, an exemplary embodiment of the present invention provides an interface method in a system-on-chip, which includes: transmitting, by a first circuit unit, first payload data transferred from a first functional block and a first signal for requesting buffer allocation for storing the first payload data to a second circuit unit, and decreasing a resource value in which an initial value is set to correspond to the number of payload data which may be stored in a buffer provided in the second circuit unit by one; storing, by the second circuit unit, the first payload data in the buffer according to the first signal; withdrawing, by the second circuit unit, payload data selected among the payload data stored in the buffer, and transferring the payload data to a second functional block, and transmitting a second signal indicating that the buffer is empty to the first circuit unit; and increasing, by the first circuit unit, the resource value by one.

Further, in order to achieve the object, another exemplary embodiment of the present invention provides a system-on-chip which may include: a first circuit unit transmitting first payload data transferred from a first functional block and a first signal for requesting buffer allocation for storing the first payload data; and a second circuit unit transmitting, when storing the first payload data in a provided buffer according to the first signal, and withdrawing payload data selected among the payload data stored in the buffer, and transferring the payload data to a second functional block, a second signal indicating that the buffer is empty to the first circuit unit, in which the first circuit unit may decrease a resource value in which an initial value is set to correspond to the number of payload data which may be stored in the buffer by one, and increase the resource value by one according to the second signal.

Further, in order to achieve the object, yet another exemplary embodiment of the present invention provides an interface method in a system-on-chip, which includes: transmitting, by a third circuit unit, first payload data transferred from a first functional block and a first signal for requesting buffer allocation for storing the first payload data to a fourth circuit unit, and decreasing a first resource value in which a first initial value is set to correspond to the number of payload data which may be stored in a first buffer provided in the fourth circuit unit by one; transmitting, by a fourth circuit unit, when storing the first payload data in the first buffer according to the first signal, and transferring payload data selected among the payload data stored in the first buffer, a second signal indicating that the first buffer is empty to the third circuit unit; increasing, by the third circuit unit, the first resource value by one according to the second signal; transmitting, by the fourth circuit unit, second payload data transferred from a third functional block and a third signal for requesting buffer allocation for storing the second payload data to the third circuit unit, and decreasing a second resource value in which a second initial value is set to correspond to the number of payload data which may be stored in a second buffer provided in the third circuit unit by one; transmitting, by the third circuit unit, when storing the second payload data in the second buffer according to the third signal, and transferring payload data selected among the payload data stored in the second buffer to a fourth functional block, a fourth signal indicating that the second buffer is empty to the fourth circuit unit; and increasing, by the fourth circuit unit, the second resource value by one according to the fourth signal.

In addition, in order to achieve the object, still yet another exemplary embodiment of the present invention may also provide a system-on-chip transmitting and receiving data between functional blocks by using the interface method.

According to the present invention, an interface method for transmitting and receiving data between various functional blocks in a system-on-chip having various functional blocks can be provided. Further, the interface method according to the present invention also enables data transmission and reception using an ID as a priority or data transmission and reception according to a QoS policy in addition to basic first in first out scheme of data transmission and reception, and enables data transmission and reception even between functional blocks using different clock frequencies.

DETAILED DESCRIPTION OF THE PREFERRED EMBODIMENT

In this specification, It should be understood that, when it is described that a component is "connected to" or "accesses" another component, the component may be directly connected to or access the other component or a third component may be present therebetween. Other expressions describing the relationship of the components, that is, expressions such as "between" and "directly between" or "adjacent to" and any component "transmits" a signal to another component should also be similarly interpreted.

Hereinafter, the present invention will be described in more detail with reference to the drawings.

Figure 1:
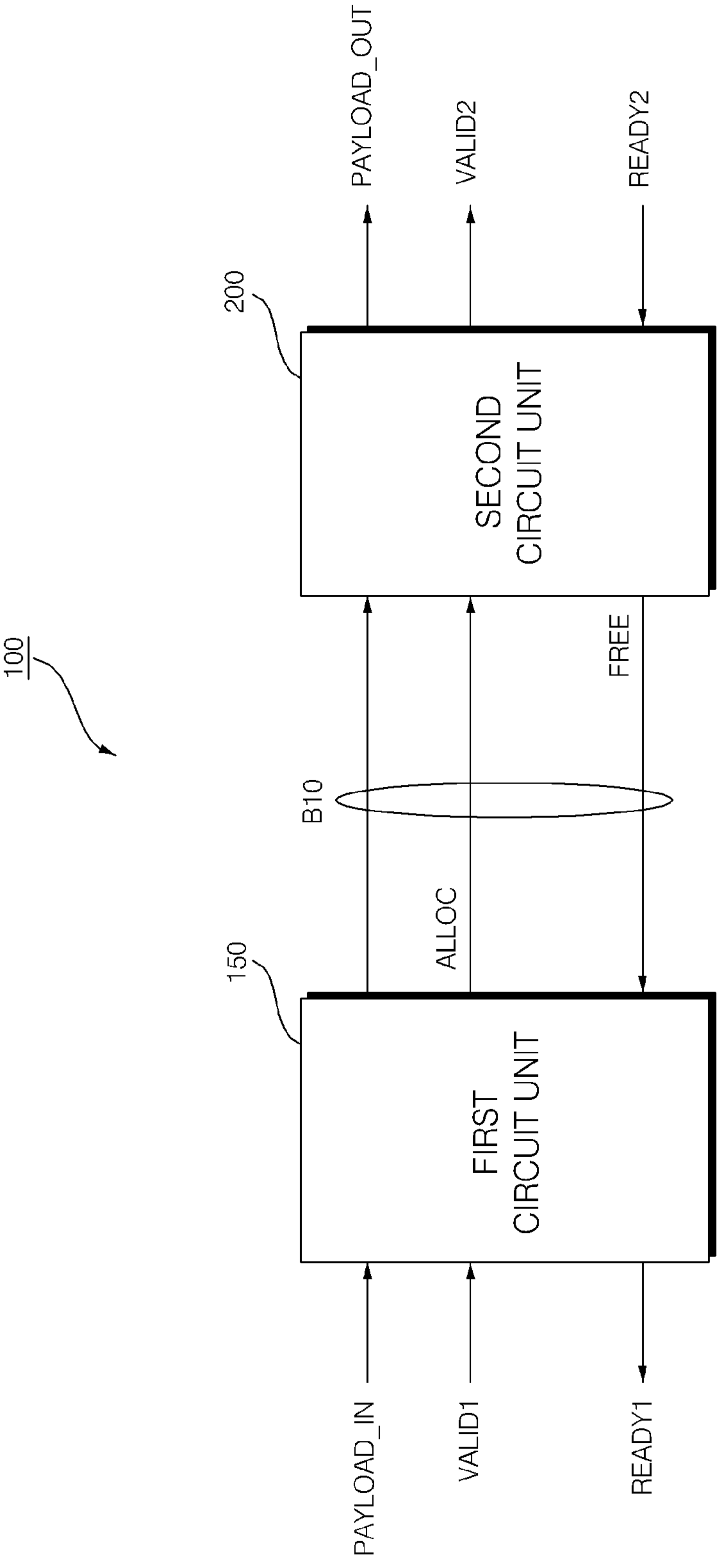
FIGS. 1 and 2 are block diagrams referred to for describing a configuration of a system-on-chip according to an exemplary embodiment of the present invention.
Figure 2:
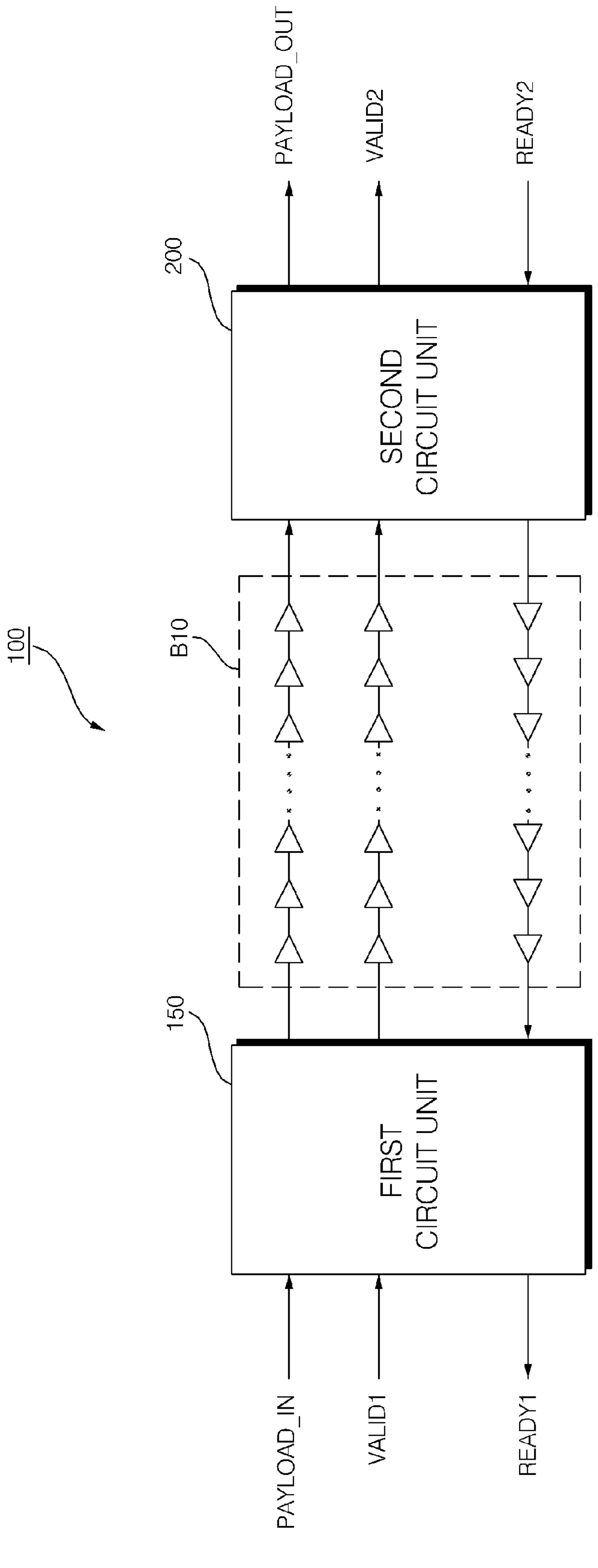

FIGS. 1 and 2 are block diagrams referred to for describing a configuration of a system-on-chip according to an exemplary embodiment of the present invention.

Referring to FIG. 1, the system-on-chip 100 may include functional blocks such as a first circuit unit 150 and a second circuit unit 200. The system-on-chip 100 may further include various functional blocks, and the functional blocks may communicate with each other through a bus in the system-on-chip 100.

The first circuit unit 150 which operates as a master may transmit payload data to the other functional block or transfer the payload data received from the functional block which operates as the master to the other functional block.

Examples of the functional block which operates as the master include a Central Processing Unit (CPU), a Graphic Processing Unit (GPU), a Digital Signal Processor (DSP), an Image Signal Processor (ISP), a Direct Memory Access (DMA), a video codec, a display controller, etc.

The second circuit unit 200 which operates as a slave may receive the payload data or transfer the payload data received from the first circuit unit 150 to the other functional block which operates as the slave.

Examples of the functional block which operates as the slave include a memory controller, special function registers (SFR) of various functional blocks, and peripheral modules such as a Universal Asynchronous Receiver/transmitter (UART), an Inter Integrated Circuit (I2C), Integrated Interchip Sound (I2S), etc.

In the first circuit unit 150, signal READY1 represents a signal for announcing that the first circuit unit 150 may accept the payload data, PAYLOAD_IN represents the payload data, signal VALID1 represents a payload data enable signal, and signal ALLOC represents a signal for requesting buffer allocation for storing the payload data.

In the second circuit unit 200, signal READY2 represents a signal for announcing a functional block to which the second circuit unit 200 is to transfer the payload data may accommodate the payload data, PAYLOAD_OUT represents the payload data transferred by the second circuit 200, signal VALID2 represents the payload data enable signal, and signal FREE represents a signal for notifying that a buffer is empty in the first circuit unit 150.

In addition, one or more buffers or register slices may be installed in a channel B10 between the first circuit unit 150 and the second circuit unit 200 as illustrated in FIG. 2.

Figure 3:
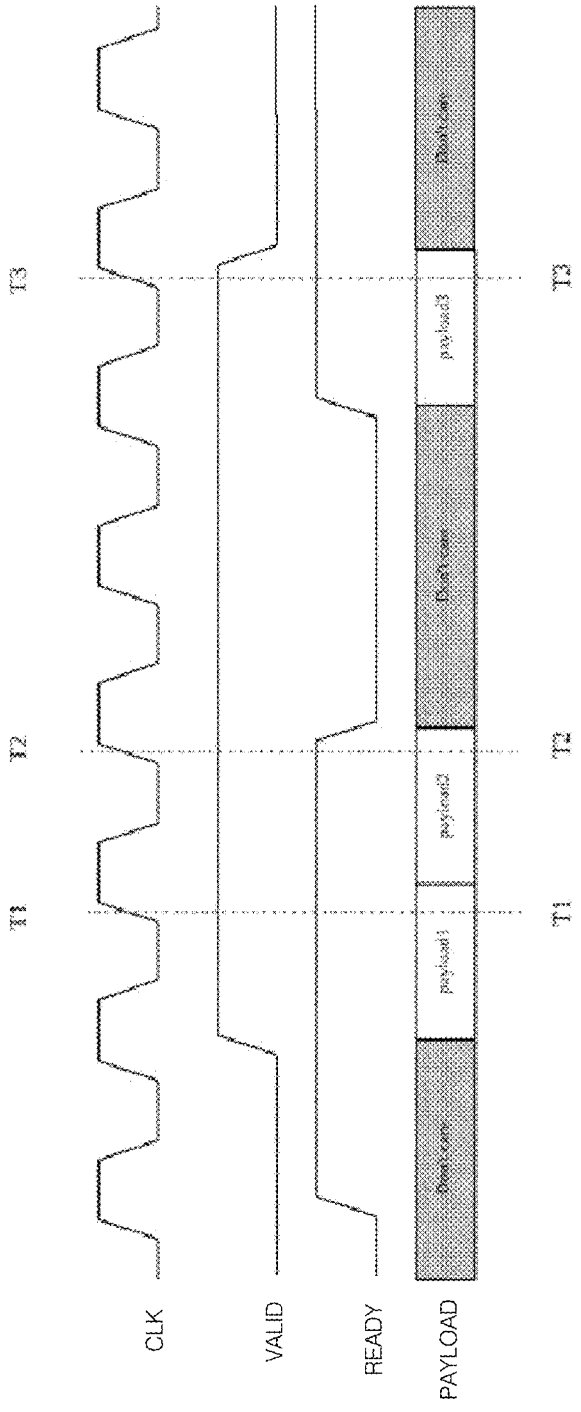
FIG. 3 is a timing diagram for a signal related to payload data transmission in FIG. 1.

FIG. 3 is a timing diagram for a signal related to payload data transmission in FIG. 1.

Referring to FIG. 3, in a receiving-side function block that receives the payload, signal READY is made in an active high state, which may represent that the payload data may be accepted. In a transmitting-side function block that transmits the payload data, it may be confirmed by the activated READY signal that the receiving-side functional block may accept the payload data, the VALID signal may be made in the active high state, the payload data may be transmitted to the receiving-side functional block through a set channel, and when transmission is completed, the VALID signal is made in a low state.

By such a process, the payload data may be transmitted between the functional blocks.

Figure 4:
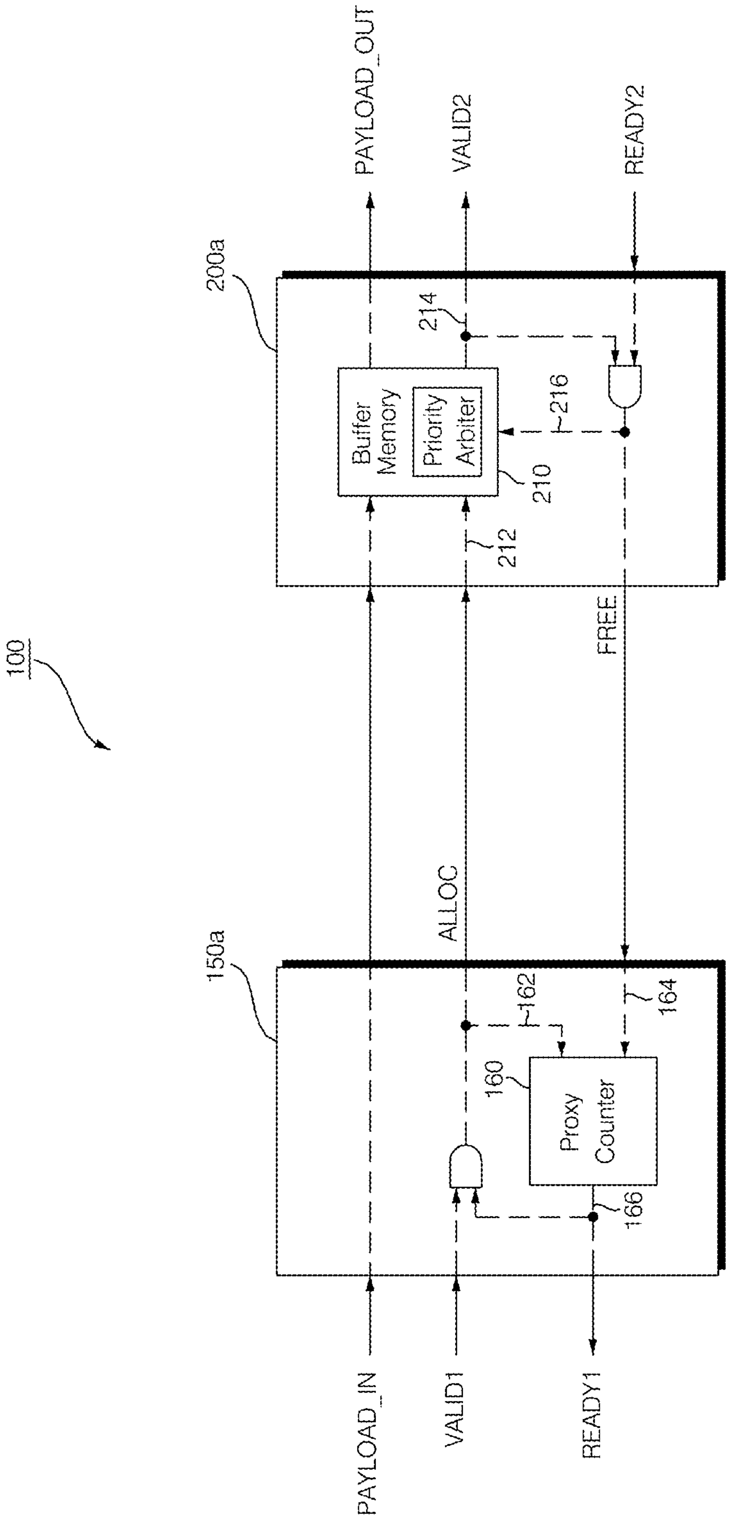
FIG. 4 is a block diagram of a system-on-chip according to a first embodiment of the present invention.

FIG. 4 is a block diagram of a system-on-chip according to a first embodiment of the present invention.

Referring to FIG. 4, in the exemplary embodiment, a first circuit unit 150*a* includes a proxy counter 160, and a second circuit unit 200*a* includes a buffer memory 210 having a priority intervention circuit.

Further, although not illustrated in FIG. 4, the first circuit unit 150*a* and the second circuit 200*a* may include a buffer or a flip-flop for data storing, a signal generation circuit, a circuit for controlling input and output signals or data, etc. As such, the component that may further include the buffer or flip-flop, the signal generation circuit, the circuit for controlling the input and output signals or data, etc., will also be similarly applied to another exemplary embodiment to be described below.

In the exemplary embodiment, the PAYLOAD_IN data input into the first circuit unit 150*a* includes an ID capable of a source block that generates the payload data. That is, the ID is an identifier capable of identifying a source functional block of the payload data, and may be configured to program a transmission priority according to the ID.

When the first circuit unit 150*a* receives the PAYLOAD_IN data while the VALID1 signal is made active high in the state in which the READY1 signal is active high, the first circuit unit 150*a* outputs the received PAYLOAD_IN data and an active high ALLOC signal to request buffer allocation for storing the PAYLOAD_IN data to the second circuit unit 200*a*.

The second circuit unit 200*a* may store the PAYLOAD_IN data in the buffer memory 210 by using the active high ALLOC signal as an input enable signal 212 of the buffer memory 210. The buffer memory 210 may store a predetermined number of payload data jointly with a corresponding ID.

When the second circuit unit 200*a* makes a VALID2 signal 214 active high for outputting the payload data while the READY2 signal is active high, an output enable signal 216 of the buffer memory 210 is output, so the second circuit unit 200*a* may output payload data selected among the payload data stored in the buffer memory 210 as data PAYLOAD_OUT according to a pre-programmed ID priority. In addition, when the VALID2 signal 214 is made active high in the state in which the READY2 signal is active high, so the payload data is withdrawn from the buffer memory 210 and output, the second circuit unit 200*a* outputs the FREE signal active high.

The proxy counter 160 of the first circuit unit 150*a* is configured to manage a resource value in which an initial value is set to correspond to a number which may be stored in the buffer memory 210. That is, the proxy counter 160 is set to count a value corresponding to the number of payload data which may be stored in the buffer memory 210, and the active high ALLOC signal 162 is configured to decrease the proxy counter 160 and the input active high FREE signal 164 is configured to increase a value of the proxy counter 160.

As a result, when the value of the proxy counter 160 is 0, the active high READY1 signal is configured not to be output according to an output value 166 of the proxy counter 160, so the buffer memory 210 is empty to output the READY1 signal active high only in a state of being capable of storing the payload data.

Figure 5:
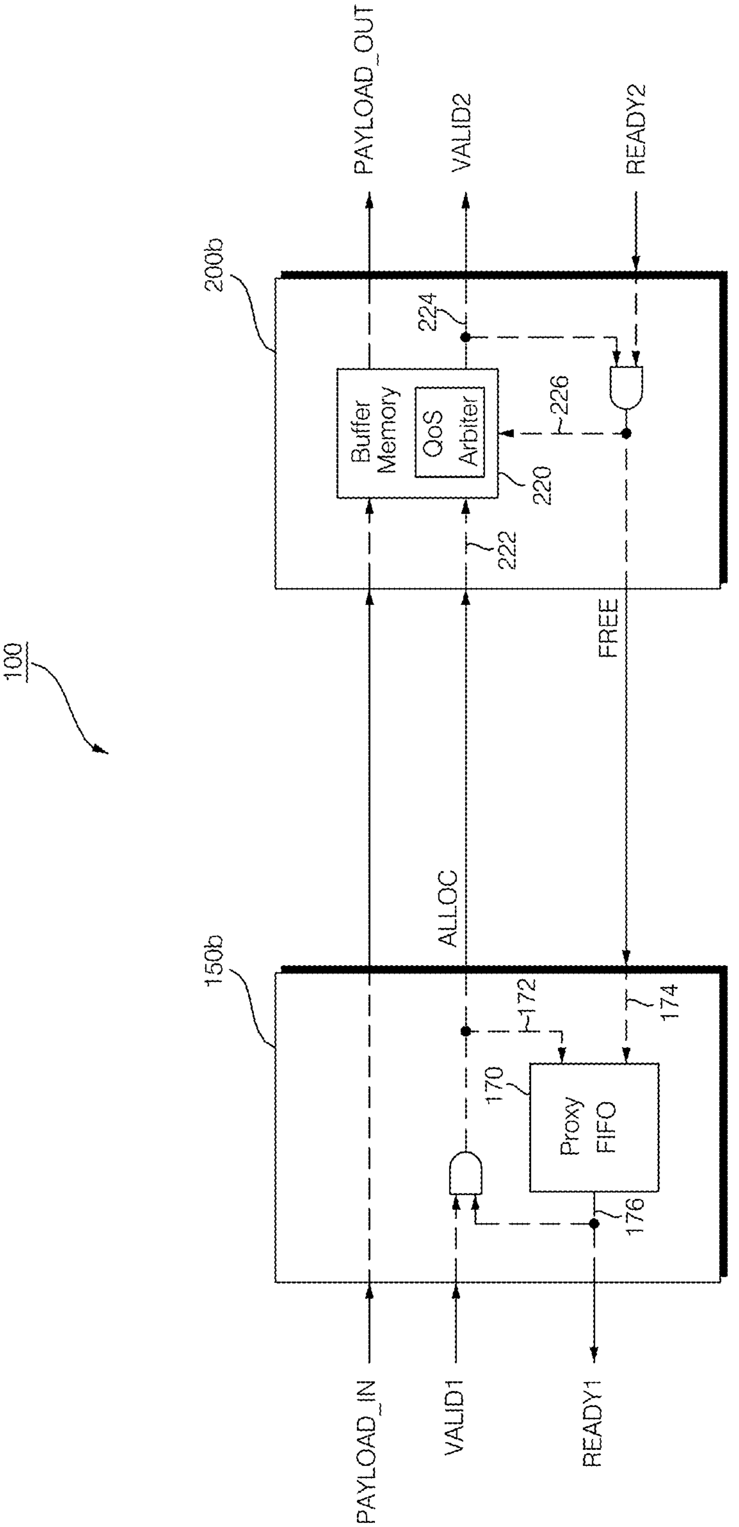
FIG. 5 is a block diagram of a system-on-chip according to a second embodiment of the present invention.

FIG. 5 is a block diagram of a system-on-chip according to a second embodiment of the present invention.

Referring to FIG. 5, in the exemplary embodiment, a first circuit unit 150*b* includes a proxy FIFO 170 for managing a resource value, and a second circuit unit 200*b* includes a buffer memory 220 having the QoS intervention circuit.

In the exemplary embodiment, the PAYLOAD_IN data input into the first circuit unit 150*b* may be payload data including quality of service (QoS) information, and a policy based on the QoS may be configured to be programmable by using the PAYLOAD_IN data.

When the first circuit unit 150*b* receives the PAYLOAD_IN data while the VALID1 signal is made in the active high state in the READY1 signal is in the active high state, the first circuit unit 150*b* outputs the received PAYLOAD_IN data and an active high ALLOC signal to request buffer allocation for storing the PAYLOAD_IN data to the second circuit unit 200*b*.

The second circuit unit 200*b* may store the PAYLOAD_IN data in the buffer memory 220 by using the active high ALLOC signal as an input enable signal 222 of the buffer memory 220. The buffer memory 220 may store a predetermined number of payload data jointly with the QoS information.

When the second circuit unit 200*b* makes a VALID2 signal 224 active high for outputting the payload data while the READY2 signal is active high, an output enable signal 226 of the buffer memory 220 is output, so the second circuit unit 200*a* may output payload data selected among the payload data stored in the buffer memory 220 as data PAYLOAD_OUT according to a pre-programmed QoS policy. In addition, when the VALID2 signal 224 is made active high in the state in which the READY2 signal is active high, so the payload data stored in the buffer memory 220 is output, the second circuit unit 200*b* may outputs the FREE signal active high.

The proxy FIFO 170 is set to a size corresponding to the number of payload data which may be stored in the buffer memory 220, and the active high ALLOC signal 172 allows the proxy FIFO 170 to perform a push operation, and the input active high FREE signal 174 allows the proxy FIFO 170 to perform a pop operation. In addition, when the proxy FIFO 170 is full, the active high READY1 signal is configured not to be output according to the signal 176 output from the proxy FIFO 170, which enables the buffer memory 220 to output the READY1 signal active high only in the state of being capable of storing the payload data.

Figure 6:
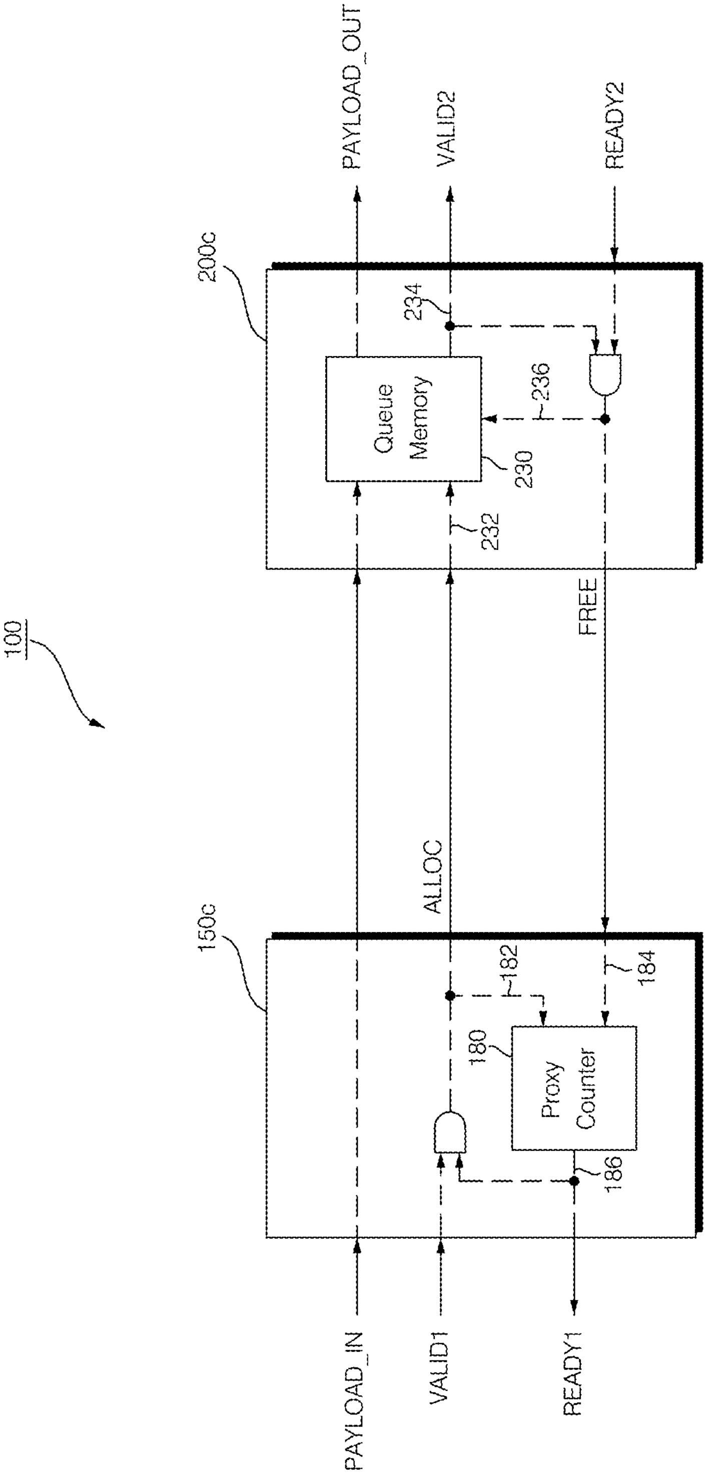
FIG. 6 is a block diagram of a system-on-chip according to a third embodiment of the present invention.

FIG. 6 is a block diagram of a system-on-chip according to a third embodiment of the present invention.

Referring to FIG. 6, in the exemplary embodiment, a first circuit unit 150*c* includes a proxy counter 180, and a second circuit unit 200*c* includes a queue memory 230.

The exemplary embodiment is different from the above-described embodiment in that the PAYLOAD_IN data input into the first circuit unit 150*c* is payload data that does not include the ID or the QoS, and other operations related to the outputs of the PAYLOAD_IN data and the ALLOC signal in the first circuit unit 150*c* in the exemplary embodiment are the same as those in the above-described embodiment.

The second circuit unit 200*b* may store a predetermined number of PAYLOAD_IN data in the queue memory 230 by using the active high ALLOC signal as an input enable signal 232 of the queue memory 230.

When the second circuit unit 200*c* makes a VALID2 signal 234 active high for outputting the payload data while the READY2 signal is active high, an output enable signal 236 of the queue memory 230 is output, so the second circuit unit 200*c* may be configured to output payload data which is first input among payload data stored in the queue memory 230 as data PAYLOAD_OUT according to a FIFO scheme. In addition, when the VALID2 signal 234 is made active high in the state in which the READY2 signal is active high, so the payload data stored in the queue memory 230 is output, the second circuit unit 200*c* may outputs the FREE signal active high.

The proxy counter 180 of the first circuit unit 150*c* is set to count a value corresponding to the number of payload data which may be stored in the queue memory 230, and the active high ALLOC signal 182 is configured to decrease the proxy counter 180 and the input active high FREE signal 184 is configured to increase a value of the proxy counter 180. As a result, when the value of the proxy counter 180 is 0, the active high READY1 signal is configured to be output according to an output value 186 of the proxy counter 180, so the queue memory 230 is empty to output the READY1 signal active high only in a state of being capable of storing the payload data.

Figure 7:
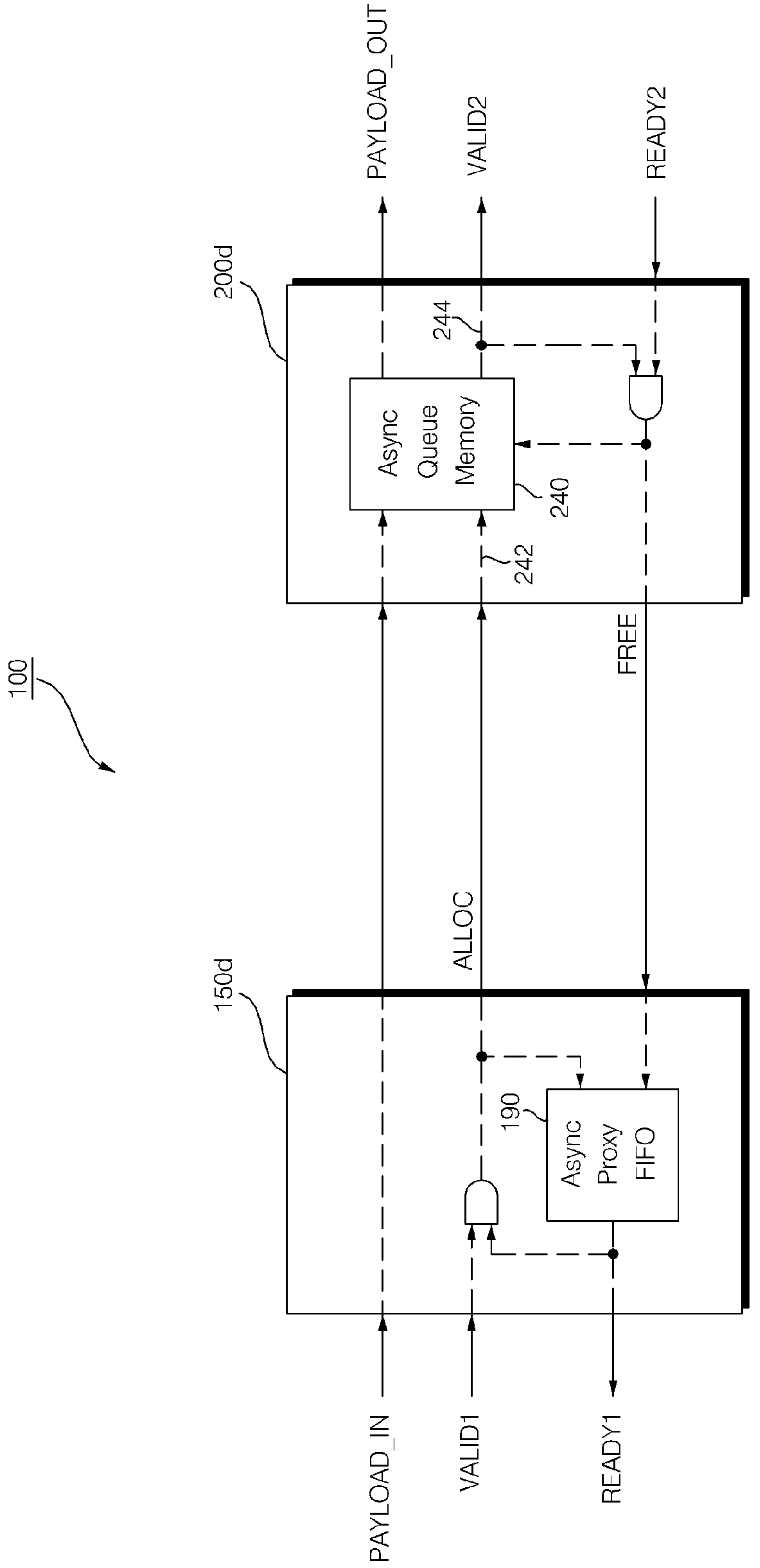
FIG. 7 is a block diagram of a system-on-chip according to a fourth embodiment of the present invention.

FIG. 7 is a block diagram of a system-on-chip according to a fourth embodiment of the present invention.

Referring to FIG. 7, in the exemplary embodiment, a first circuit unit 150*d* includes an async proxy FIFO 190 for managing the resource value, and a second circuit unit 200*d* includes an async queue memory 240.

In the exemplary embodiment the PAYLOAD_IN data input into the first circuit unit 150*d* is the payload data that does not include the ID or the QoS information, and the output of the payload data and the ALLOC signal in the first circuit unit 150*d*, and the operation related to the async proxy FIFO 190, and a process of storing and outputting the payload data, and outputting the FREE signal in the second circuit unit 200*d* are basically the same as those described in the above-described example.

However, in that a clock signal used in the process of outputting the payload data and the ALLOC signal in the first circuit unit 150*d* and a clock signal used in the process of storing the payload data in the async queue memory 240, withdrawing and outputting the payload data in the async queue memory 240, and outputting the FREE signal in the second circuit unit 200*d* have different clock frequencies in the exemplary embodiment, the exemplary embodiment is different from the above-described embodiment.

That is, when the first circuit unit 150*d* receives the PAYLOAD_IN data while the VALID1 signal is made active high in the state in which the READY1 signal is active high, the process of outputting the received PAYLOAD_IN data and the active ALLOC signal operates in synchronization with a first clock signal.

In addition, a process of storing the PAYLOAD_IN data in the async queue memory 240 by using the active high ALLOC signal as an input enable signal 242 of the async queue memory 240, and outputting the payload data stored in the async queue memory 240 in the FIFO scheme by making the VALID2 signal 244 active high for outputting the payload data in the state in which the READY2 signal is active high, and the process of outputting the FREE signal active high operate in synchronization with a second clock signal different from the first clock signal.

By such a configuration, data may also be configured to be transmitted and received between functional blocks using different clock frequencies.

Figure 8:
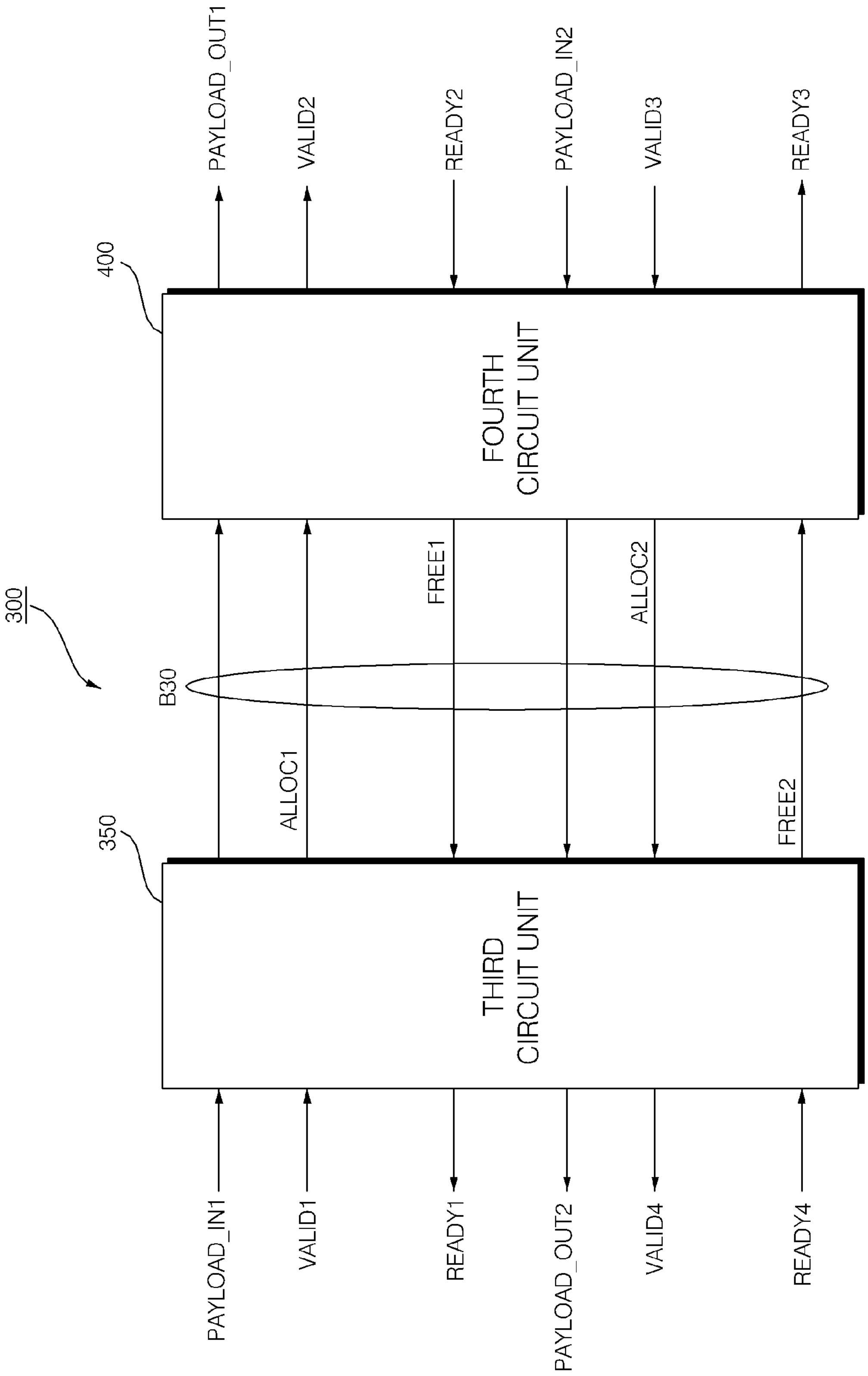
FIG. 8 is a block diagram referred to for describing a configuration of a system-on-chip according to another embodiment of the present invention.

FIG. 8 is a block diagram referred to for describing a configuration of a system-on-chip according to another embodiment of the present invention.

Referring to FIG. 8, a system-on-chip 300 according to the exemplary embodiment includes a third circuit unit 350 and a fourth circuit unit 400.

Each of the third circuit unit 350 and the fourth circuit unit 400 may include both the first circuit unit 150 and the second circuit unit 200 illustrated in FIG. 1, and may transmit or receive the payload data. That is, in the third circuit unit 350, signal READY1 represents a signal for announcing that the third circuit unit 350 may accept the payload data, PAYLOAD_IN1 represents input payload data, signal VALID1 represents a PAYLOAD_IN1 data enable signal, and signal ALLOC1 represents a signal for requesting buffer allocation for storing the payload data. Further, in the third circuit unit 350, signal READY4 represents a signal for announcing that the functional block to which the third circuit unit 350 is to transfer the payload data may accept the payload data, PAYLOAD_OUT2 represents output payload data, signal VALID4 represents a PAYLOAD_OUT2 data enable signal, and signal FREE2 represents a signal for notifying that the buffer is empty in the fourth circuit unit 400.

In the fourth circuit unit 400, signal READY2 represents a signal for announcing that the functional block to which the fourth circuit unit 400 is to transfer the payload data may accept the payload data, PAYLOAD_OUT1 represents output payload data, signal VALID2 represents a PAYLOAD_OUT1 data enable signal, and signal FREE1 represents a signal for notifying that the buffer is empty in the third circuit unit 350. Further, in the fourth circuit unit 400, signal READY3 represents a signal for announcing that the fourth circuit unit 400 may accept the payload data, PAYLOAD_IN2 represents the input payload data, signal VALID3 represents a PAYLOAD_IN2 data enable signal, and signal ALLOC2 represents a signal for requesting buffer allocation for storing the payload data.

In addition, one or more buffers or register slices may be installed in a channel B30 between the first circuit unit 350 and the fourth circuit unit 400.

Figure 9:
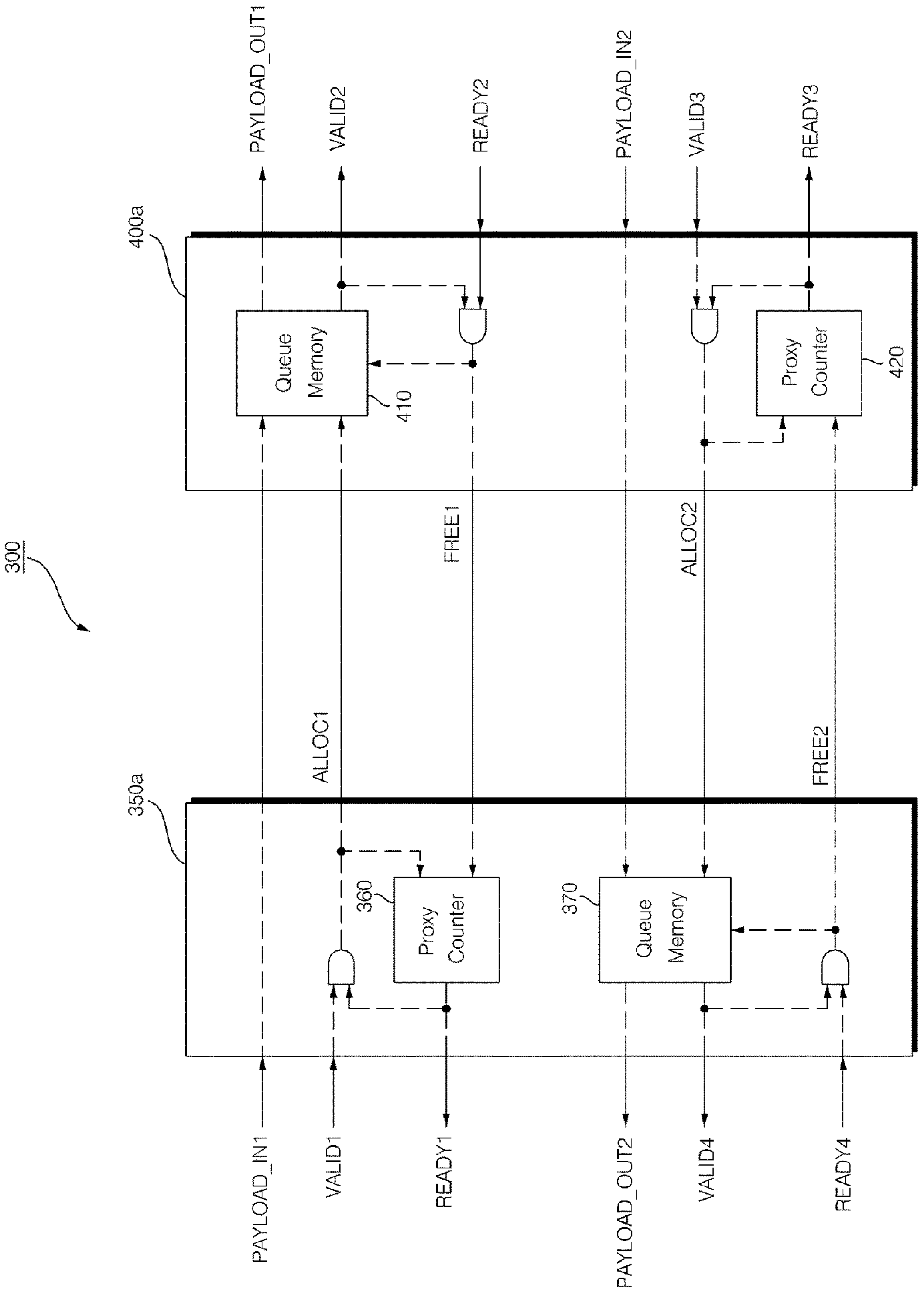
FIG. 9 is a block diagram of a system-on-chip according to a fifth embodiment of the present invention.

FIG. 9 is a block diagram of a system-on-chip according to a fifth embodiment of the present invention.

Referring to FIG. 9, in the exemplary embodiment, a third circuit unit 350*a* includes a proxy counter 360 for managing the resource value at a payload data transmitting side and includes a queue memory 370 at a payload data receiving side. A fourth circuit unit 400*a* includes a queue memory 410 at the payload data receiving side and includes a proxy counter 420 for managing the resource value at the payload data transmitting side.

The PAYLOAD_IN1 data or the PAYLOAD_IN2 data is the payload data that does not includes the ID or QoS.

Therefore, a process of transmitting the payload data from the third circuit 350*a* to the fourth circuit unit 400*b* and a process of transmitting the payload data from the fourth circuit unit 400*b* to the third circuit 350*a* are basically the same as those described in the third embodiment of FIG. 6.

However, in order to increase the use efficiency of the bus, the third circuit unit 400*a* may be configured to transmit the FREE2 signal to the third circuit unit 350*a* through a channel through which the PAYLOAD_IN1 data and the ALLOC1 signal are transmitted from the third circuit unit 350*a* to the fourth circuit unit 400*a*, and the third circuit unit 350*a* may be configured to transmit the FREE1 signal to the fourth circuit unit 400*a* through a channel through which the PAYLOAD_IN2 data and the ALLOC2 signal are transmitted from the fourth circuit unit 400*a* to the third circuit unit 350*a*. Such a channel configuration may also be similarly applied to the following embodiment.

Figure 10:
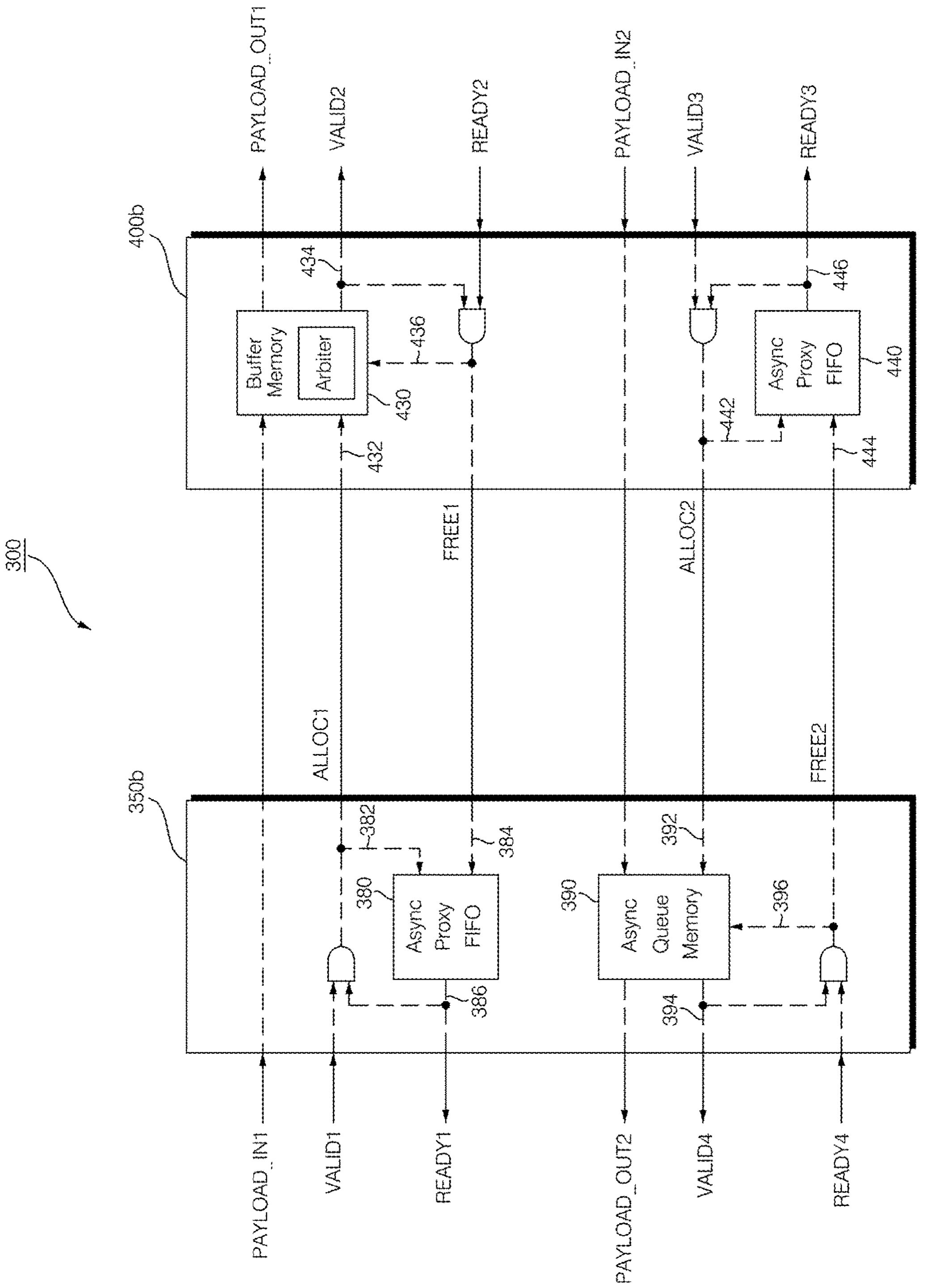
FIG. 10 is a block diagram of a system-on-chip according to a sixth embodiment of the present invention.

FIG. 10 is a block diagram of a system-on-chip according to a sixth embodiment of the present invention.

Referring to FIG. 10, a third circuit unit 350*b* includes an async proxy FIFO 380 at the payload data transmitting side and includes an async queue memory 390 at the payload data receiving side.

The fourth circuit unit 400*b* includes a buffer memory 430 having the priority intervention circuit at the receiving side, and includes an async proxy FIFO 440 at the payload data transmitting side.

The PAYLOAD_IN1 data is payload data including at least one of the ID or the QoS information, and the PAYLOAD_IN2 is the payload data that does not include the ID or the QoS information.

In the process of transmitting the payload data from the third circuit unit 350*b* to the fourth circuit unit 400*b*, when the third circuit unit 350*b* receives the PAYLOAD_IN1 data while the VALID1 signal is made active high in the state in which the READY1 signal is active high, the third circuit unit 350*b* outputs the received PAYLOAD_IN1 data and the active high ALLOC signal to request buffer allocation for storing the PAYLOAD_IN1 data to the fourth circuit unit 300*b*.

The fourth circuit unit 400*b* may store the PAYLOAD_IN1 data in the buffer memory 430 by using the active high ALLOC signal as an input enable signal 432 of the buffer memory 430. The buffer memory 430 may store a predetermined number of payload data jointly with at least one of the ID and the QoS information.

When the fourth circuit unit 400*b* makes a VALID2 signal 434 active high for outputting the payload data while the READY2 signal is active high, an output enable signal 436 of the buffer memory 430 is output, so the fourth circuit unit 400*b* may output payload data selected among the payload data stored in the buffer memory 430 as data PAYLOAD_

OUT1 according to a pre-programmed QoS policy or ID priority. In addition, when the VALID2 signal 434 is made active high in the state in which the READY2 signal is active high, so the payload data stored in the buffer memory 430 is output, the fourth circuit unit 400*b* may outputs the FREE1 signal active high.

The async proxy FIFO 380 is set to a size corresponding to the number of payload data which may be stored in the buffer memory 430, and the active high ALLOC signal 382 allows the proxy FIFO 380 to perform the push operation, and the input active high FREE1 signal 384 allows the proxy FIFO 380 to perform the pop operation. In addition, when the proxy FIFO 380 is full, the active high READY1 signal is configured not to be output according to the signal 386 output from the proxy FIFO 380, which enables the buffer memory 430 to output the READY1 signal active high only in the state of being capable of storing the payload data.

In the process of transmitting the payload data from the fourth circuit unit 400*b* to the third circuit unit 350*b*, when the fourth circuit unit 400*b* receives the PAYLOAD_IN2 data while the VALID3 signal is made active high in the state in which the READY3 signal is active high, the fourth circuit unit 400*b* outputs the received PAYLOAD_IN2 data and the active high ALLOC2 signal to request buffer allocation for storing the PAYLOAD_IN2 data to the third circuit unit 350*b*.

The third circuit unit 350*b* may store a predetermined number of PAYLOAD_IN data in the async queue memory 390 by using the active high ALLOC2 signal as an input enable signal 392 of the async queue memory 390. When the third circuit unit 350*b* makes a VALID4 signal 394 active high for outputting the payload data while the READY4 signal is active high, an output enable signal 396 of the async queue memory 390 is output, so the third circuit unit 350*b* may be configured to output payload data which is first input among payload data stored in the async queue memory 390 as data PAYLOAD_OUT2 according to the FIFO scheme. In addition, when the VALID4 signal 394 is made active high in the state in which the READY4 signal is active high, so the payload data is output from the async queue memory 390, the third circuit unit 350*b* may outputs the FREE2 signal active high.

The proxy FIFO 440 of the fourth circuit unit 400*b* is set to a size corresponding to the number of payload data which may be stored in the async queue memory 390, and the active high ALLOC signal 442 allows the proxy FIFO 440 to perform the pop operation, and the input active high FREE2 signal 444 allows the proxy FIFO 440 to perform the pop operation. In addition, when the proxy FIFO 440 is full, the active high READY3 signal is configured not to be output according to the signal 446 output from the proxy FIFO 440, which enables the async queue memory 390 to output the READY3 signal active high only in the state of being capable of storing the payload data.

In addition, in the exemplary embodiment, a clock signal used in the operation in the third circuit unit 350*b* and the process of transmitting the payload data from the third circuit unit 350*b* to the fourth circuit unit 400*b* and a clock signal used in the operation in the fourth circuit unit 400*b* and the process of transmitting the payload data from the fourth circuit unit 400*b* to the third circuit unit 300*b* have different clock frequencies.

By such a configuration, one functional block may serves as both the master or the server, and may be configured to transmit and receive data even between functional blocks using different clock frequencies.

Meanwhile, the system-on-chip and a bus interfacing method in the system-on-chip according to the present invention may not be limitedly applied to the configurations of the exemplary embodiments described as above, but the exemplary embodiments may be configured by selectively combining all or some of the respective embodiments so as to be variously modified.

Further, although the exemplary embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An interface method in a system-on-chip, comprising:

setting, by a first circuit unit, a first resource value to a first initial value corresponding to a number of payload data capable of being stored in a first buffer provided in a second circuit unit;

transmitting, by the first circuit unit, first payload data transferred from a first functional block and a first signal for requesting buffer allocation for storing the first payload data to the second circuit unit, and decreasing the first resource value by one;

storing, by the second circuit unit, the first payload data in the first buffer according to the first signal;

withdrawing, by the second circuit unit, payload data selected among the payload data stored in the first buffer, and transferring the payload data to a second functional block, and transmitting a second signal indicating that the first buffer is empty to the first circuit unit;

increasing, by the first circuit unit, the first resource value by one according to the second signal;

setting, by the second circuit unit, a second resource value to a second initial value corresponding to a number of payload data capable of being stored in a second buffer provided in the first circuit unit;

transmitting, by the second circuit unit, second payload data transferred from a third functional block and a third signal for requesting buffer allocation for storing the second payload data to the first circuit unit, and decreasing the second resource value by one;

storing, by the first circuit unit, the second payload data in the second buffer according to the third signal;

withdrawing, by the first circuit unit, payload data selected among the payload data stored in the second buffer, and transferring the payload data to a fourth functional block, and transmitting a fourth signal indicating that the second buffer is empty to the second circuit unit; and increasing, by the second circuit unit, the second resource value by one according to the fourth signal, wherein a first clock signal used by the first circuit unit and a second clock signal used by the second circuit unit have different clock frequencies.

2. The method of claim 1, wherein the fourth signal is transmitted through a channel through which the first payload data and the first signal are transmitted, and the second signal is transmitted through a channel through which the second payload data and the third signal are transmitted.

3. The method of claim 1, wherein the first payload data includes an ID capable of identifying a block which generates the first payload data, and the selected payload data among the payload data stored in the first buffer is selected according to a predetermined ID priority.

4. The method of claim 1, wherein the first circuit unit includes a first proxy circuit unit and the second circuit unit includes a second proxy circuit unit, the first proxy circuit unit and the second proxy circuit unit configured to assert a fifth signal and a sixth signal, respectively, based on the first resource value and the second resource value.

5. The method of claim 4, wherein the fifth signal indicates that payload data is enabled to be accepted from the first functional block to the third circuit unit only when the first resource value has a non-zero value, and wherein the sixth signal indicates that payload data is enabled to be accepted from the third functional block to the fourth circuit unit only when the second resource value has a non-zero value.

6. The method of claim 4, wherein the first proxy circuit unit independently determines assertion of the fifth signal by locally maintaining the first resource value, and an output of the first proxy circuit unit triggers a transition of the fifth signal prior to a completion of synchronization of the second signal, and wherein the second proxy circuit unit independently determines assertion of the sixth signal by locally maintaining the second resource value, such that an output of the second proxy circuit unit triggers a transition of the sixth signal prior to a completion of synchronization of the fourth signal.

7. An interface method in a system-on-chip, comprising:

setting, by a first circuit unit, a resource value to an initial value corresponding to a number of payload data storable in a buffer of a second circuit unit;

transmitting, by the first circuit unit, first payload data transferred from a first functional block and a first signal for requesting buffer allocation for storing the first payload data to the second circuit unit, and decreasing the resource value by one;

storing, by the second circuit unit, the first payload data in the buffer according to the first signal;

withdrawing, by the second circuit unit, payload data selected among the payload data stored in the buffer and transferring the payload data to a second functional block, and transmitting a second signal indicating that the buffer is empty to the first circuit unit; and increasing, by the first circuit unit, the resource value by one according to the second signal, wherein a first clock signal used by the first circuit unit and a second clock signal used by the second circuit unit have different clock frequencies, and wherein the first circuit unit includes a proxy circuit unit configured to assert a third signal for the first functional block based on the resource value.

8. The method of claim 7, wherein the third signal indicates that payload data is enabled to be accepted from the first functional block to the first circuit unit only when the resource value has a non-zero value.

9. The method of claim 7, wherein the proxy circuit unit independently determines assertion of the third signal to the first functional block by locally maintaining the resource value, and wherein an output value of the proxy circuit unit triggers a transition of the third signal prior to a completion of synchronization of the second signal to the first clock signal.

10. The method of claim 7, wherein the first circuit unit comprises an asynchronous proxy FIFO for managing the resource value, wherein the asynchronous proxy FIFO is set to a size corresponding to the number of payload data which may be stored in the buffer of the second circuit unit, and wherein the first circuit unit is configured to update the resource value by performing a push operation on the asynchronous proxy FIFO in response to the first signal and performing a pop operation on the asynchronous proxy FIFO in response to the second signal.

11. A system-on-chip comprising:

a first circuit unit transmitting first payload data transferred from a first functional block and a first signal for requesting buffer allocation for storing the first payload data; and a second circuit unit with a buffer, the second circuit unit storing the first payload data in the buffer according to the first signal, withdrawing payload data selected among the payload data stored in the buffer to transfer the selected payload data to a second functional block, and transmitting a second signal indicating that the buffer is empty to the first circuit unit, wherein the first circuit unit sets a resource value to an initial value corresponding to a number of payload data capable of being stored in the buffer, decreases the resource value by one when the first circuit unit transmitting the first payload data, and increases the resource value by one according to the second signal, wherein a first clock signal used by the first circuit unit and a second clock signal used by the second circuit unit have different clock frequencies, and wherein the first circuit unit includes a proxy circuit unit configured to assert a third signal for the first functional block based on the resource value.

12. The system-on-chip of claim 11, wherein the third signal indicates that payload data is enabled to be accepted from the first functional block to the first circuit unit only when the resource value has a non-zero value.

13. The system-on-chip of claim 11, wherein the proxy circuit unit independently determines assertion of the third signal by locally maintaining the resource value, and wherein an output value of the proxy circuit unit triggers a transition of the third signal prior to a completion of synchronization of the second signal to the first clock signal.

* * * * *